July 9, 1935.   H. P. PHILLIPS   2,007,691
PISTON CENTRALIZING MEANS
Filed July 14, 1932   2 Sheets-Sheet 1

INVENTOR:
Harold P. Phillips.
BY
ATTORNEY.

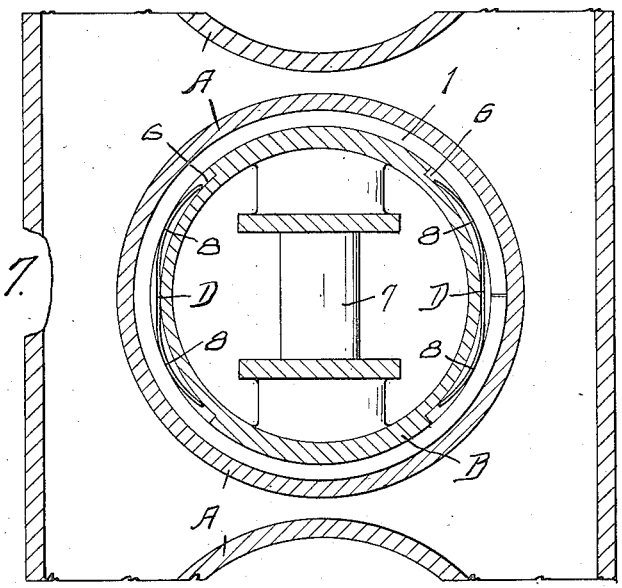
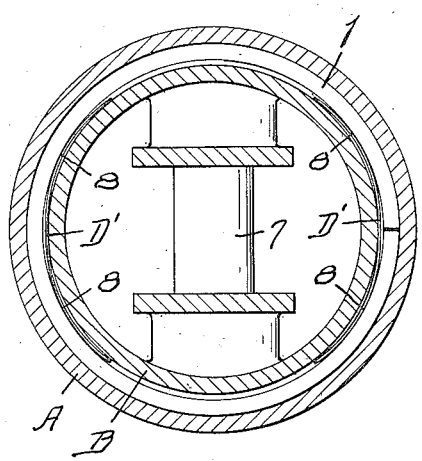
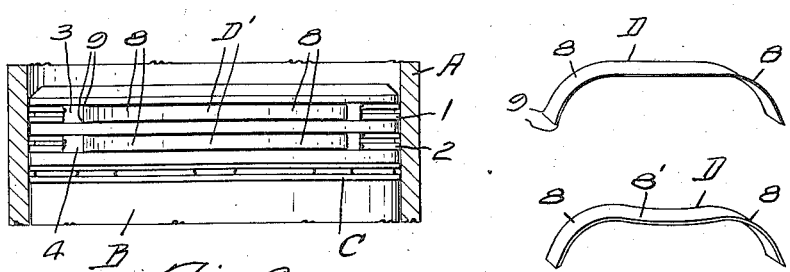
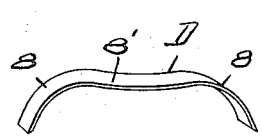

Patented July 9, 1935

2,007,691

UNITED STATES PATENT OFFICE 2,007,691

PISTON CENTRALIZING MEANS

Harold P. Phillips, Maplewood, Mo.

Application July 14, 1932, Serial No. 622,474

8 Claims. (Cl. 309—5)

My invention is concerned with pistons having split rings of the type used in internal combustion engines of the present high speed types.

The invention is concerned primarily with segmental resilient members, which members I term "piston centralizers", and they are positioned between one or more of the piston rings and the piston wall on diametrically opposite sides of the piston, in the direction of the slapping motion of the piston which is transversely of the cylinder block of the engine, and the piston centralizers are designed and used for the purpose of eliminating rocking or slapping motion of the piston when reciprocating in its engine cylinder.

A further object of the invention is to provide one or more of the ring grooves of a piston with a pair of opposed centralizer receiving grooves formed by end milling them in the bottom of the ring grooves thereof, which grooves serve to prevent circumferential displacement of the centralizers, and also permits the use of full thickness piston rings of standard, or universal design.

A further object of the invention resides in the provision of a segmental resilient piston centralizing member having relatively close arc shaped ends so that the arc of contact with the ring will be relatively long.

A still further object of the invention resides in the provision of resilient means for centralizing the piston within an engine cylinder, which possesses advantages in points of simplicity and efficiency, and, at the same time proves itself comparatively inexpensive in cost of manufacture.

Other and meritorious features of the invention will more fully appear from the following description, appended claims and the accompanying drawings, in which:

Fig. 7 is a modification of the invention, and the engine block shown shows parts of adjacent cylinders.

Figure 8 is a further modification of the invention.

Fig. 9 is a side elevation of the modification shown in Fig. 8.

Fig. 10 illustrates the centralizing member used in the modification in Fig. 8.

Fig. 11 illustrates a further modified form of the piston centralizing member.

Figure 1:
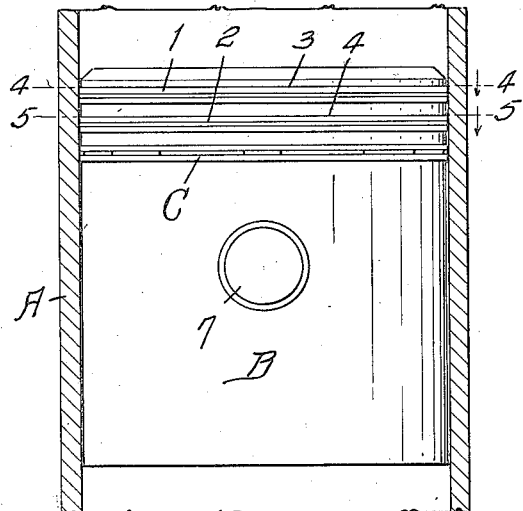
Fig. 1 is a side elevation of the piston disposed within a cylinder shown in sectional elevation and showing the piston provided with split rings in its grooves.
Figure 2:
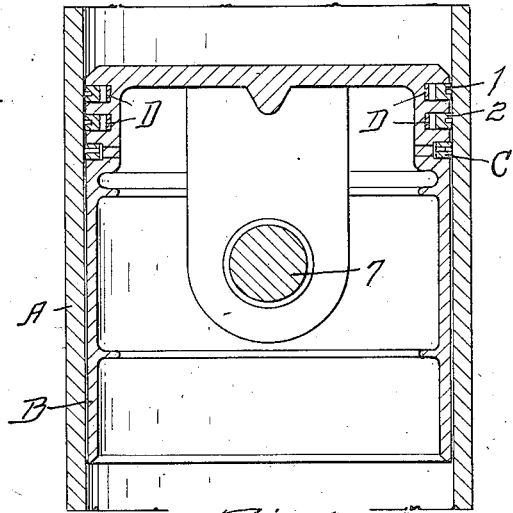
Fig. 2 is a vertical sectional view of a piston, its rings and my improved piston centralizers, the same being shown in a cylinder shown in sectional elevation.

As shown in Figs. 1 and 2, the reference character A designates part of an engine cylinder, and, B designates a piston reciprocably disposed therein.

The reference numerals 1 and 2 designate split piston rings engaging in the upper two annular ring grooves 3 and 4, respectively, on the piston. The lower ring designated C is preferably an oil ring. Behind each ring 1 and 2 are two like piston centralizers, as will be hereinafter more fully described and designated as D. Each ring 1 and 2 is preferably provided on its inner face, on opposite sides of the split joint thereof, with a vertical arcuate recess designated 5, in which portions of the centralizers D spanning the split joint of the ring are adapted to engage, as clearly shown in Figs. 3 and 4, for the purpose of preventing rotation of the rings in their grooves. However, where it is desired to permit free rotation of the rings 1 and 2 in the ring grooves on the piston, these recesses may be eliminated, as clearly shown in the modification shown in Fig. 7.

Each ring groove 3 and 4 is provided on its side wall with a pair of segmental recesses designated 6. These recesses 6 are disposed diametrically opposite each other and on the thrust sides of the piston, which sides are at right angles to the longitudinal axis of the wrist pin 7 carried by the piston B.

Figure 6:
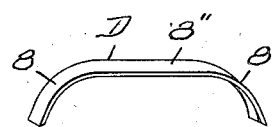
Fig. 6 is a perspective view of the preferred form of one of the piston centralizing members.

As shown in detail in Figs. 6, 10 and 11, the resilient piston centralizing member D is shown in the form of a special U-shaped segment having two arcuately shaped corners 8 at the ends thereof. Two of these piston centralizers are preferably used in connection with each of the upper two rings on the piston. However, where more than two compression rings are employed, with or without a single oil ring, the centralizers may be used in connection with all the rings, or if desired, only with the upper ring.

Figure 3:
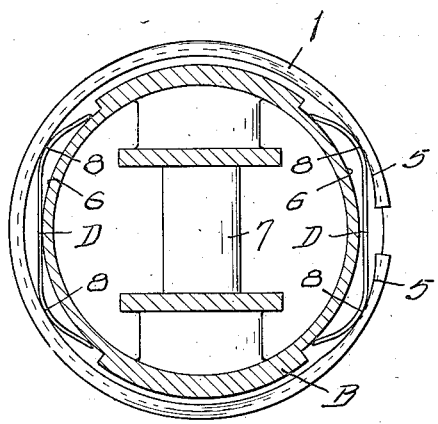
Fig. 3 is a horizontal sectional view of a piston taken on a line with the upper ring groove of the piston showing the position of a ring and the centralizer before the piston has been inserted into the engine cylinder.
Figure 4:
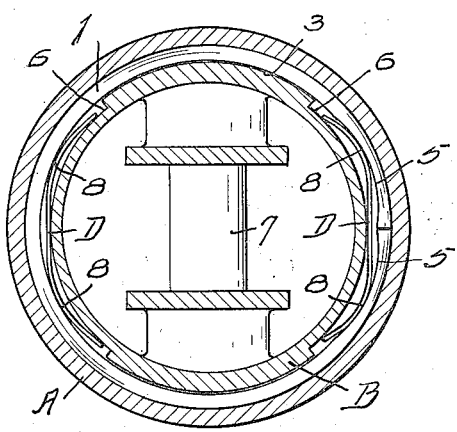
Fig. 4 is a view taken on line 4—4 of Fig. 1.

In use, one piston centralizing member D is positioned in each of the two ring groove recesses 6 of the piston and then the two rings 1 and 2 are applied to their respective ring grooves 3 and 4 with the piston centralizers D disposed between the rings 1 and 2 and the piston, as clearly shown in Figs. 3 and 4. After thus applying the rings 1 and 2 to the piston, each ring is rotated in its respective ring groove to a position where the inner facial recesses 5 adjacent the ends of the split ring engaging therein receive and accommodate the arcuate corners 8 of one of each pair of centralizers D, which position of the rings prevent rotation thereof during reciprocation of the piston in the engine cylinder A, as will be apparent from Figs. 4 and 5.

The split ring recesses 5 are scribed from the arc of a larger circle than the corners 8 of the resilient piston centralizers D, thus allowing the rings limited rotation in either direction, but preventing the ends of the split ring passing beyond the arcuate corners 8 of the resilient centralizers D spanning the split joints of the rings. The other resilient centralizer used in connection with each ring does not have its arcuate corners 8 engaging in ring recesses, but they merely engage the inner face of the ring diametrically opposite the arcuate corners 8 of the centralizer positioned adjacent the split end of the ring. In reality, the resiliency of the arcuate portions 8 of the centralizer, on the opposite side of the piston from the split joint thereof, is stiffer than the resiliency of the arcuate portions 8 of the split ring at the ring joint, due to the fact that the arcuate portions 8 of the centralizer at the ring joint are receivable in the ring recesses 5 which establishes a greater space between one ring groove recess 6 and the arcuate recesses 5 on the inner faces of each ring and between the other ring groove recess 6 and the non-recessed inner face of the rings diametrically opposite the split joints thereof. This feature is clearly illustrated in Fig. 3 of the drawings, which shows the normal positions of the two centralizers before the piston is inserted into an engine cylinder.

Thus, with this arrangement, it will be seen, that I do not attempt to increase the tension of the split ring at the ends thereof, but by reversing the two compression rings designated 1 and 2 in grooves 3 and 4, so that their split joints are on opposite sides of the piston, I centralize the piston relative to the cylinder, and in so doing eliminate piston slap and clicks otherwise noticeable during reciprocating movements of the piston in an engine cylinder. The slap and clicks mentioned are due to the fact that cylinders soon wear into funnel shape and do not maintain their true cylindrical formation. The centralizers D being placed on the major and minor thrust sides of the piston behind two of the rings, greater resistance must be overcome before slap or clicks resulting therefrom can be established than where the pistons are not provided with the centralizers. As the resilient centralizers are designed to meet the thrust condition of the piston, the piston thrust does not overcome the resistance of the centralizers on opposite sides of the piston, thus centralization of the piston relative to the engine cylinder is established which overcomes piston slap and consequent clicks therefrom.

It will be observed that each contralizer has a two point contact with its ring, and that these contacts are curved and spaced a suitable distance apart. The two point contact of each centralizer has a decided advantage over the single point contact of the expander employed in my co-pending application Serial Number 550,374, filed July 13th, 1931 and over the expanders of the non-segmental types of ring expanders, and my improvement overcomes breaking of segmental centralizers, which was a fault under some conditions, with the expander shown in my co-pending application.

In the modification shown in Fig. 7, it will be apparent that I eliminate the arcuate ring recess 5 shown in Figs. 3, 4, 5 and 6 and that by so doing, the ring is free to rotate during reciprocating movements of the piston.

Figure 5:
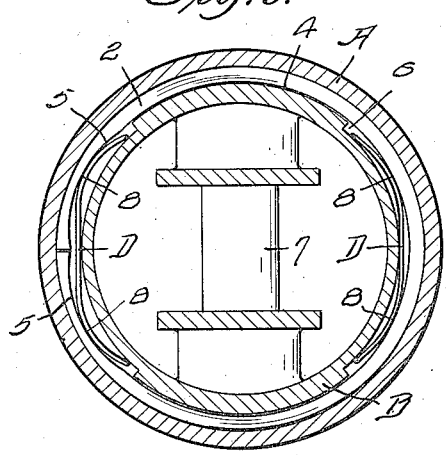
Fig. 5 is a view taken on line 5—5 of Fig. 1.

In the modification shown in Fig. 8, it will be apparent that I eliminate the piston ring groove recesses 6 as well as the ring recesses 5 which are employed in Figs. 4, 5, and 7. The centralizers designated D' employed in Fig. 8 are designed for use with pistons where the ring grooves 6 are eliminated, thus being cheaper to install. In this modification, the gauge of the centralizers is less in thickness than the centralizers used in connection with ring groove recesses 6 so as to fit in the clearance between the ring and the ring groove. Further, the centralizers D', one of which is shown in detail in Figs. 9 and 10, have one of their ends broadened, as at 9, so that it can be forced into its ring groove to prevent displacement thereof circumferentially of the piston.

In the modification shown in Fig. 11, the connecting portion 8' between the arcuate corners or ends thereof is curved slightly inwardly in reverse relation to the curved or arcuate ends 8.

The connecting portion 8'' of the centralizer shown in detail in Fig. 6 is substantially flat and straight, but the material from which it is formed is resilient, or springy.

The centralizer used as hereindescribed prevents leakage past the rings, as well as eliminating piston slap.

My centralizers D can be used also where it is desired to eliminate piston slap only. But even in this instance, loss of compression is improved. To eliminate piston slap only, one centralizer member can be placed under each ring on the minor thrust side of the piston, but where certain loss of compression is also to be gained by the use thereof, one centralizing member is placed under each ring, such as one on the major thrust side of the piston under one ring and one on the other thrust side of the piston under the other ring.

In positioning the centralizers on the thrust sides of the piston and not to the sections of the pistons engaging the cylinder walls between the cylinders, is of major importance, as it eliminates any danger of enough centralizer spring tension being used to cause the motor to run hot, or to run sluggish, because the water jacket is always greater on the sides of the motor block than between the cylinders, thus there is greater water circulation on the side of the engine block and in some engines there is no water space between cylinders. The elimination of all extra ring tension and friction at the cylinder joints lengthwise of the motor block, not only theoretically eliminates extra and undue heat and sluggishness, but from innumerable actual tests made where extreme spring tension has been used, there has not been any indication of heating or sluggishness.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In combination with a piston having a ring receiving groove and a split ring therefor, said groove having a pair of opposed recesses in the base thereof, said ring having a pair of arcuate recesses upon its inner face adjacent the split joint thereof, a pair of segmental resilient piston centralizing members, each of said members having its ends arcuately shaped, one of said members being disposed in one of the ring groove recesses and behind the split joint of the ring so that the arcuate ends engage in the recess of the ring and the other of said members being disposed in the other of the ring groove recesses with the arcuate ends thereof engaging the inner face of the ring at spaced points.

2. In combination with a piston having a ring receiving groove and a split ring mounted therein, said piston having a pair of diametrically opposed elongated recesses formed in the base of the ring groove on the thrust sides of the piston and a resilient piston centralizing member positioned in each ring groove recess for exerting radial pressure against the ring at two points.

3. In combination with a piston having a ring receiving groove and a split ring mounted therein, of two resilient piston centralizing members disposed between the piston ring groove base and the ring, said centralizing members each having two points of arc contact with the ring and three points of contact with the base of the ring groove.

4. In combination with a piston having a ring receiving groove and a split ring mounted therein, of two resilient piston centralizing members disposed between the piston ring groove base and the ring, said centralizing members each having two points of arc contact with the ring and at least two points of contact with the base of the ring groove.

5. In combination with a piston having a ring receiving groove and a split ring mounted therein, said piston having a pair of diametrically opposed elongated recesses formed in the base of the ring groove on the thrust sides of the piston and a resilient piston centralizing member positioned in each ring groove recess for exerting radial pressure against the ring at two points of arc contact therewith, the arc contact of one of the piston centralizing members being on opposite sides of the split of the piston ring.

6. In combination with a piston having a ring receiving groove and a split ring mounted therein, said piston having a pair of diametrically opposed elongated recesses formed in the base of the ring groove on the thrust sides of the piston and a resilient piston centralizing member positioned in each ring groove recess for exerting radial pressure against the ring at two closely spaced points and said points of pressure being adjacent the ends of the centralizing members.

7. In combination with a piston having a ring receiving groove and a split ring mounted therein, said piston having a pair of diametrically opposed short circumferential recesses formed in the base of the ring groove on the thrust sides only of the piston and a relatively short flexibly resilient piston centralizing member having arc shaped ends positioned in each ring groove recess to limit circumferential displacement thereof relative to the piston and to cause the arc shaped ends of each centralizing member to contact the inner face of the ring and exert radial pressure against the ring on the thrust sides of the piston.

8. In combination with a piston having a ring receiving groove and a split ring mounted therein, said piston having a pair of diametrically opposed elongated recesses formed in the base of the ring groove on the thrust sides of the piston and a resilient piston centralizing member having outwardly curved extremities positioned in each ring groove recess for exerting radial pressure against the ring at two adjacent points on the thrust sides of the piston.

HAROLD P. PHILLIPS.